United States Patent Office 3,206,462
Patented Sept. 14, 1965

3,206,462
QUATERNARY POLY(OXYALKYLENE)ALKYL-
BIS(DIETHYLENETRIAMINE) COMPOUNDS
Leslie P. McCarty, Midland, Mich., assignor to The Dow Chemical Company, Midland, Mich., a corporation of Delaware
No Drawing. Filed Oct. 31, 1962, Ser. No. 234,523
7 Claims. (Cl. 260—256.4)

The present invention is directed to quaternary poly-(oxyalkylene)alkylbis(diethylene triamine) compounds of the formula

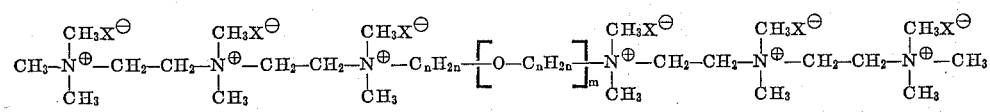
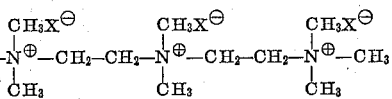

wherein X is an electronegative group, $n$ is an integer of from 3 to 4, both inclusive, $m$ represents an integer and the expression

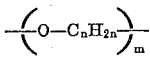

is a poly(oxyalkylene) chain having a molecular weight of from about 300 to about 2,050. In the present specification and claims the term electronegative group or anionic group is employed to refer to ions formed by the disassociation of compounds possessing ionizable cations and serving as electron donors. Representative compounds are phenols, acids, salts, hydroxides, and enols, such as mineral acids; barbiturates wherein the two hydrogen atoms of the position No. 5 of barbituric acid are substituted; aliphatic acids, saturated or unsaturated, including fatty acids; and other acidic compounds such as benzoic acid, salicylic acid, p-aminobenzoic acid, cresotic acid, phenol, picolinic acid and nicotinic acid. Other representative compounds include hydrobromic acid, hydrochloric acid, hydrofluoric acid, hydriodic acid, carbonic acid, sulfuric acid, sulfurous acid, nitric acid, nitrous acid, phosphoric acid, allylbarbituric acid, amobarbital, aprobarbital, barbital, butabarbital, butallylonal, butethal, cyclobarbital, cyclopal, diallylbarbituric acid, 5-ethyl-5-pentylbarbituric acid, hexethal, hexobarbital, mephobarbital, pentobarbital, phenobarbital, probarbital, propallylonal, secobarbital, vinbarbital, formic acid, acetic acid, propionic acid, butyric acid, heptanoic acid, pelargonic acid, decanoic acid, oleic acid, lauric acid, stearic acid, and partially ionized polyvalent acids such as, for example, the hydrogen sulfate (or bisulfate) ion, the bicarbonate (or hydrogen carbonate) ion, the monohydrogen phosphate ion and the dihydrogen phosphate ion.

Thus X in the foregoing formula represents hydroxide, aliphatic carboxylates, substituted barbiturates, or salt-forming groups derived by the removal of hydrogen from mineral acids.

The compounds to be employed according to the present invention are amorphous solid materials of low solubility in many non-polar solvents, such as benzene and diethyl ether, and of moderate to high solubility in polar solvents such as water, acetone, methanol, and ethanol. They are of very high inherent toxicity and are useful as miticides and rodenticides. They have curarimimetric and neuromuscular blocking activity in animals. With regard for their other properties they can be used as flocculants for the flocculation of finely suspended solids, such as clays, mineral ores, and the like, in liquid media such as water and lower alcohols.

The quaternized compounds of the present invention in the basic form, having the formula

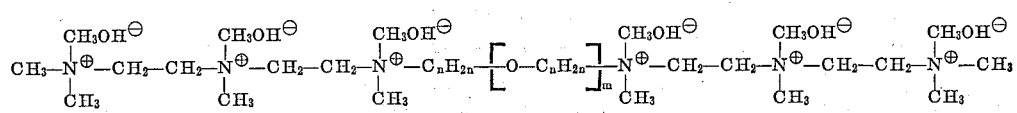
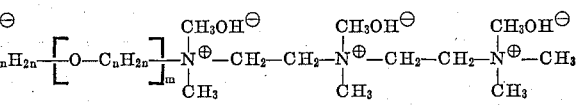

are prepared by reacting together a poly(oxyalkylene)alkylbis(diethylenetriamine) compound of the formula

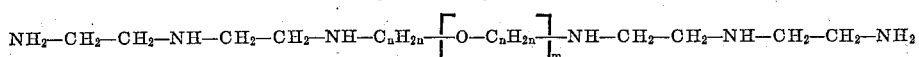
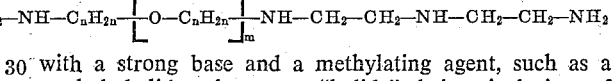

with a strong base and a methylating agent, such as a methyl halide, the term "halide" being inclusive of bromide, chloride, fluoride, and iodide, only. Conveniently the reaction is carried out in a liquid reaction medium, such as water or other polar solvent. Good results are obtained when employing about one molecular proportion of poly(oxyalkylene)alkylbis(diethylenetriamine), at least 14 molecular proportions of base, and about 14 molecular proportions of the methyl halide. However, it is preferred to employ an excess of the methyl halide in the amount of about 20 molecular proportions. A large excess of methyl halide can be employed but is not desirable from the standpoint of economy.

The base can be, for example, a metal hydroxide or carbonate such as an alkali metal or alkaline earth metal hydroxide or carbonate. Representative bases are sodium hydroxide, sodium carbonate, potassium hydroxide, lithium carbonate, calcium hydroxide, or the like. When operating in accordance with the preceding steps and employing not substantially in excess of molecular proportions of base per 1 molecular proportion of poly(oxyalkylene)alkylbis(diethylenetriamine) and 14 molecular proportions of the methyl halide, there is obtained the product of the present invention wherein X is the particular halide in the methyl halide employed as reactant. When employing amounts of base substantially in between the limits of 8 and 14 molecular proportions, there are obtained mixtures of the quaternized product where X is halide and hydroxide.

The reaction takes place at temperatures at which halide of reaction is evolved in the mixture and conveniently at temperatures of from 20° to 80° C. with the production of quaternary poly(oxyalkylene)alkylbis(1,1,4,4,7,7,7-heptamethyldiethylenetriamine) product either in the basic or halide form (where X=OH or halide) and water of reaction. This halide usually appears in the reaction mixture as metal halide.

In carrying out the reaction, the reactants are mixed and contacted together in any convenient fashion and the resulting mixture is maintained for a period of time in the reaction temperature range to complete the reaction. Small quantities of the quaternary are formed immediately upon the contacting of the reactants. Where it is desired to obtain higher yields, the reaction mixture can be maintained in the reaction temperature range until the evolution of halide of reaction is substantially complete. Upon completion of the reaction, the resulting reaction mixture with the quaternary product can be utilized without further treatment thereto for the useful properties of the present invention.

In a preferred manner of preparing the quaternary product wherein X is an electronegative group other than hydroxide, the reaction mixture as prepared above, wherein the quaternary product is in the basic form, is washed with water to remove the halide of reaction. Thereafter the washed mixture is acidified by the addition of an acid or acidic compound. The acidified mixture is concentrated by removal of water of reaction, as by evaporation, to obtain as a residue the quaternary product where X is an electronegative group other than hydroxide. In such procedures, the acidification consumes about 6 moles of acid per about 1 mole of the basic quaternary compound, and conveniently the acid is supplied in these amounts. The acidification takes place at temperatures over a wide range and conveniently at room temperature of about 20° to 25° C., with the production of the desired quaternary compound.

The quaternary product of the present invention can be purified in known procedures. In a convenient procedure, an aqueous solution of the quaternary product where X is an electronegative group other than hydroxide, is contacted with a strong base, such as sodium hydroxide, silver hydroxide, or preferably, an ammonium type ion-exchange resin in the hydroxide form. Preferred ion exchange resins have network structures which essentially are the copolymers of styrene and divinylbenzene and which have thereon quaternary ammonium groups. In the aqueous solution resulting from the contacting, the basic quaternary salt is formed and separated by conventional procedures. The product can then be acidified as hereinbefore described to obtain the compounds wherein X is an electronegative group other than hydroxide in substantially pure form.

Preferred embodiments of the present invention constitute those quaternary compounds wherein X is an electronegative group derived from a mineral acid and wherein X is an electronegative group derived from a barbiturate.

The following examples illustrate the invention but are not to be considered as limiting it.

EXAMPLE 1

*1,1'-hexakis(oxybutylene)butylbis(1,1,4,4,7,7,7-heptamethyldiethylenetriamine trichloride)* with water, and the resulting aqueous mixture acidified with hydrochloric acid. Water is removed from the acidified mixture by evaporation under sub-atmospheric pressure to obtain the 1,1'-hexakis(oxybutylene)butylbis(1,1,4,4,7,7,7-heptamethyldiethylenetriamine trichloride) product as an amorphous residue. Product residue is then azeotroped with ethanol. The product thus purified is found to be of moderate to high solubility in water and other polar solvents and of low solubility in non-polar solvents, and to have a molecular weight of 1655.

EXAMPLE 2

*1,1'-hexakis(oxybutylene)butylbis(1,1,4,4,7,7,7-heptamethyldiethylenetriamine tribarbitalate)*

1,1' - hexakis(oxybutylene)butylbis(1,1,4,4,7,7,7-heptamethyldiethylenetriamine trichloride) (100 mg.; 0.06 millimole), prepared according to Example 1, is dissolved in 10 milliliters of water. The resulting solution containing the quaternized product is passed through an ion-exchange column of a height of 17 centimeters and a diameter of 1 centimeter. The resin employed in the column consists of 50 mesh size beads of a styrene-divinylbenzene copolymer network which has ammonium groups thereon in the hydroxide form, the resin being crosslinked to the extent of about 8 percent. The solution containing the quaternized product as prepared above is run through the ion exchange column at a rate of 1.5 milliliters per minute, and effluent collected. This effluent contains the 1,1' - hexakis(oxybutylene)butylbis(1,1,4,4,7,7,7 - heptamethyldiethylenetriamine trihydroxide) in pure form.

Barbital (100 mg.; 0.54 millimole) is dissolved in 1.0 milliliter of 95 percent ethanol. The resultant alcoholic solution of barbital is added to the effluent collected as above containing the quaternized product in the basic form, thereby neutralizing the effluent and forming in solution the 1,1'-hexakis(oxybutylene)butylbis(1,1,4,4,7,7,7-heptamethyldiethylenetriamine tribarbitalate) product. This product is separated as a solid having a molecular weight of 1995.

In a similar manner the other products of the present invention, representatives of which follow, are prepared:

1,1' - tetrakis(oxybutylene)butylbis(1,1,4,4,7,7,7-heptamethyldiethylenetriamine triphenolate) (molecular weight of 1310), by reacting together 1,1'-tetrakis(oxybutylene)butylbis(1,1,4,4,7,7,7 - heptamethyldiethylenetriamine trihydroxide) and phenol.

1,1' - pentatriacontakis(oxypropylene)propylbis(1,1,4,4,7,7,7-heptamethyldiethylenetriamine tribromide) (molecular weight of 2960), by reacting together 1,1'-pentatriacontakis (oxypropylene) propylbis (diethylenetriamine), calcium hydroxide, and methyl bromide.

1,1' - heptacosakis(oxybutylene)butylbis(1,1,4,4,7,7,7 - heptamethyldiethylenetriamine trisalicylate) (molecular $$\begin{array}{c} CH_3Cl^\ominus \\ | \\ CH_3-N^\oplus-CH_2-CH_2-N^\oplus-CH_2-CH_2-N^\oplus C_4H_8 \\ | \\ CH_3 \end{array} \begin{array}{c} CH_3Cl^\ominus \\ | \\ \end{array} \begin{array}{c} CH_3Cl^\ominus \\ | \\ \end{array} \left[-C-C_4H_8-\right]_6 \begin{array}{c} CH_3Cl^\ominus \\ | \\ N^\oplus-CH_2-CH_2-N^\oplus-CH_2-CH_2-N^\oplus-CH_3 \\ | \\ CH_3 \end{array} \begin{array}{c} CH_3Cl^\ominus \\ | \\ \end{array} \begin{array}{c} CH_3Cl^\ominus \\ | \\ \end{array}$$

1,1'-hexakis(oxybutylene)butylbis(diethylenetriamine) (5.0 grams; about 0.007 mole) is mixed with 50 milliliters of 95 percent ethanol. To the resulting mixture are added rapidly portionwise and with stirring 18.0 grams of methyl iodide (0.13 mole) and 10.6 grams of anhydrous sodium carbonate (0.10 mole). The reaction mixture is maintained for a period of two hours with stirring at an approximate temperature range of from 75° to 80° C. 25 milliliters of water are then added to the reaction mixture, which is subsequently maintained for a period of about 16 hours under the same stirring and temperature conditions as those prior to the addition of water. The resultant reaction mixture containing the 1,1' - hexakis(oxybutylene)butylbis(1,1,4,4,7,7,7-heptamethyldiethylenetriamine trihydroxide) is then permitted to cool to room temperature, the cooled mixture washed weight of 3230), by reacting together 1,1'-heptacosakis (oxybutylene)butylbis(1,1,4,4,7,7,7 - heptamethyldiethylenetriamine trihydroxide) and salicylic acid.

1,1' - nonadecakis(oxypropylene)propylbis(1,1,4,4,7,7,7-heptamethyldiethylenetriamine tributabarbitalate) (molecular weight of 2825), by reacting together 1,1'-nonadecakis(oxypropylene)propylbis(1,1,4,4,7,7,7 - heptamethyldiethylenetriamine trihydroxide) and butabarbital.

1,1' - hexakis(oxybutylene)butylbis(1,1,4,4,7,7,7 - heptamethyldiethylenetriamine triphenobarbitalate) molecular weight of 2290), by reacting together 1,1'-hexakis(oxybutylene)butylbis(1,1,4,4,7,7,7 - heptamethyldiethylenetriamine trihydroxide) and phenobarbital.

1,1' - hexakis(oxybutylene)butylbis(1,1,4,4,7,7,7 - heptamethyldiethylenetriamine triacetate) (molecular weight of 1250), by reacting together 1,1'-hexakis(oxybutylene)

butylbis(1,1,4,4,7,7,7 - heptamethyldiethylenetriamine trihydroxide), and acetic acid.

1,1' - hexacosakis(oxypropylene)propylbis(1,1,4,4,7,7,7-heptamethyldiethylenetriamine tris(bisulfate)) (molecular weight of 2485), by reacting together 1,1'-hexacosakis (oxypropylene)propylbis(1,1,4,4,7,7,7 - heptamethyldiethylenetriamine trihydroxide) and sulfuric acid.

1,1' - heneicosakis(oxybutylene)butylbis(1,1,4,4,7,7,7 - heptamethyldiethylenetriamine tribarbitalate) (molecular weight of 3075), by reacting together 1,1'-heneicosakis (oxybutylene)butylbis(1,1,4,4,7,7,7 - heptamethyldiethylenetriamine trihydroxide) and barbital.

1,1' - pentadecakis(oxybutylene)butylbis(1,1,4,4,7,7,7 - heptamethyldiethylenetriamine tricresolate) (molecular weight of 2280), by reacting together 1,1'-pentadecakis (oxybutylene)butylbis(1,1,4,4,7,7,7 - heptamethyldiethylenetriamine trihydroxide) and cresol.

1,1' - heptakis(oxypropylene)propylbis(1,1,4,4,7,7,7 - heptamethyldiethylenetriamine tripicolinate) (molecular weight of 1585), by reacting together 1,1'-heptakis(oxypropylene)propylbis(1,1,4,4,7,7,7 - heptamethyldiethylenetriamine trihydroxide) and picolinic acid.

1,1' - tridecakis(oxybutylene)butylbis(1,1,4,4,7,7,7-heptamethyldiethylenetriamine tris(p-aminobenzoate)) (molecular weight of 2215), by reacting together 1,1'-tridecakis(oxybutylene)butylbis(1,1,4,4,7,7,7 - heptamethyldiethylenetriamine trihydroxide) and p-aminobenzoic acid.

1,1' - hexadecakis(oxypropylene)propylbis(1,1,4,4,7,7,7-heptamethyldiethylenetriamine tributethalate) (molecular weight of 2645), by reacting together 1,1'-hexadecakis (oxypropylene)propylbis(1,1,4,4,7,7,7 - heptamethyldiethylenetriamine trihydroxide) and butethal.

1,1' - dodecakis(oxypropylene)propylbis(1,1,4,4,7,7,7-heptamethyldiethylenetriamine trinitrate) (molecular weight of 1515), by reacting together 1,1'-dodecakis(oxypropylene) propylbis (1,1,4,4,7,7,7 - heptamethyldiethylenetriamine trihydroxide) and nitric acid.

1,1' - tritriacontakis(oxypropylene)propylbis(1,1,4,4,7,7,7-heptamethyldiethylenetriamine tributyrate) (molecular weight of 2885), by reacting together 1,1'-tritriacontakis(oxypropylene)propylbis(1,1,4,4,7,7,7 - heptamethyldiethylenetriamine trihydroxide) and butyric acid.

1,1' - hexakis(oxybutylene)butylbis(1,1,4,4,7,7,7-heptamethyldiethylenetriamine tribarbitalate) (molecular weight of 1995), by reacting together 1,1'-hexakis(oxybutylene)butylbis(1,1,4,4,7,7,7 - heptamethyldiethylenetriamine trihydroxide) and barbital.

1,1' - nonadecakis(oxypropylene)propylbis(1,1,4,4,7,7,7-heptamethyldiethylenetriamine tribromide) (molecular weight of 2335), by reacting together 1,1'-nonadecakis (oxypropylene)propylbis(1,1,4,4,7,7,7 - heptamethyldiethylenetriamine trihydroxide) and hydrogen bromide.

1,1' - hexakis(oxybutylene)butylbis(1,1,4,4,7,7,7-heptamethyldiethylenetriamine tristearate) (molecular weight of 2595), by reacting together 1,1'-hexakis(oxybutylene) butylbis(1,1,4,4,7,7,7-heptamethyldiethylenetriamine trihydroxide) and stearic acid.

1,1' - nonadecakis(oxypropylene propylbis(1,1,4,4,7,7,7-heptamethyldiethylenetriamine tris(5-ethyl-5-pentylbarbiturate)) (molecular weight of 2905), by reacting together 1,1' - nonadecakis(oxypropylene)propylbis(1,1,4,4,7,7,7-heptamethyldiethylenetriamine trihydroxide) and 5-ethyl-5-pentylbarbituric acid.

1,1' - nonadecakis(oxypropylene)propylbis(1,1,4,4,7,7,7-heptamethyldiethylenetriamine trihydroxide) (molecular weight of 1655), by reacting together 1,1'-nonadecakis (oxypropylene)propylbis(diethylenetriamine), methyl iodide, and sodium hydroxide.

Of the product of the present invention wherein X is a group derived from an aliphatic acid, the preferred group is derived from an aliphatic acid containing not in excess of 18 carbon atoms. The preferred barbiturate is one wherein the substituents on the No. 5 position are selected from the group consisting of phenyl and lower alkyl containing from 2 to 5 carbon atoms, inclusive.

When the products of the present invention are utilized as hereinbefore set forth, the unmodified compounds can be employed. However, the present invention also encompasses the use of the compounds in formulations. In such use, one or more of the compounds can be dissolved in water or other polar liquid to form a solvent carrier composition. Also, when desired, one or more of the compounds can be dispersed upon a finely divided solid and the resulting preparation employed as a dust. In other procedures, the products can be employed as constituents of organic liquid compositions, oil-in-water or water-in-oil emulsions or water dispersions with or without the addition of wetting, dispersing or emulsifying agents.

In representative operations, 1,1'-hexakis(oxybutylene) butylbis(1,1,4,4,7,7,7-heptamethyldiethylenetriamine trichloride) gives substantially complete controls of two-spotted spider mite (*Tetranychus bimaculatus*) at concentrations of 1000 parts per million by weight. In further operations, this same compound gives excellent curarimimetric effects in animal tissue at dosages of 1.0 milligram per kilogram of tissue weight.

The poly(oxyalkylene)alkybis(diethylenetriamine) compounds to be employed as starting materials according to the present invention are prepared by reacting diethylenetriamine with a polyoxyalkylenedisulfonate, having the formula

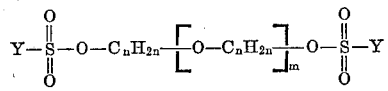

Throughout the present specification, Y represents a radical selected from the group consisting of lower alkyl and phenyl. Conveniently the reaction is carried out in an inert liquid reaction medium for example, dioxane.

Some of the desired product is obtained when employing any proportion of reactants; however, as skilled chemists will understand, it is preferable to employ an excess of the diethylenetriamine in order to obtain higher yields. The reaction takes place smoothly at temperatures of from about 85° to about 120° C. Upon completion of the reaction, the excess of the diethylenetriamine is removed by suitable means and the reaction mixture treated with caustic alkali to precipitate the corresponding metal sulfonate from solution and liberate the poly(oxyalkylene)alkylbis(diethylenetriamine) compound. The latter can be purified, as, for example, by azeotropic distillation, fractional distillation, or the like.

The polyoxyalkylene disulfonate, as used above, can be prepared by reacting a chlorosulfonic acid having the formula

with the appropriate polyglycol, having the formula

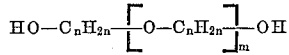

in the presence of an acid binding or neutralizing agent or hydrogen chloride acceptor. The reaction is conveniently carried out in a liquid reaction medium, and is preferably carried out in a polar solvent as reaction medium, such as pyridine. The starting materials are consumed in equimolecular proportions; and, efficiently, starting materials are supplied in these proportions. However, the amounts of the reactants to be employed are not critical, some of the desired product being obtained when employing any proportion of the reactants. The reaction is exothermic and takes place smoothly at temperatures of from about 0° to about 30° C., with production of the polyoxyalkylenedisulfonate and hydrochloride byproduct. The byproduct can be removed from the reaction mixture by various means, such as washing with water, and the solvent removed from the reaction medium, as for example, by filtration. The polyoxyalkylenedisulfonate, obtained as a result of these operations, can be purified in ways known in the art.

I claim:
1. Compound of the formula

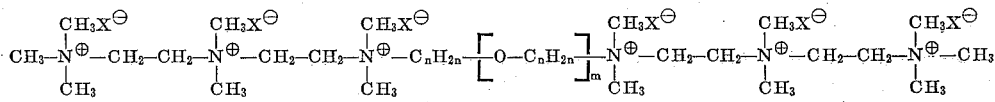

wherein X is an electronegative group, $n$ is an integer of from 3 to 4, both inclusive, $m$ represents an integer, and the expression $(OC_nH_{2n})_m$ is a poly(oxyalkylene) chain having a molecular weight of from about 300 to about 2050.

2. Compound of the formula

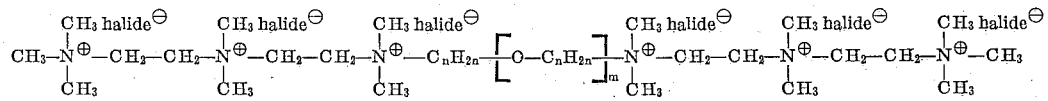

wherein $n$ is an integer of from 3 to 4, both inclusive, $m$ represents an integer, and the expression $(OC_nH_{2n})$ is a poly(oxyalkylene) chain having a molecular weight of from about 300 to about 2050.

3. The compounds claimed in claim 1 wherein X is substituted barbiturate.

4. 1,1'-hexakis(oxybutylene)butylbis(1,1,4,4,7,7,7-heptamethyldiethylenetriamine trichloride).

5. 1,1'-nonadecakis(oxypropylene)propylbis(1,1,4,4,7,7-heptamethyldiethylenetriamine tribromide).

6. 1,1'-hexakis(oxybutylene)butylbis(1,1,4,4,7,7,7-heptamethyldiethylenetriamine trichloride).

7. 1,1'-nonadecakis(oxypropylene)propylbis(1,1,4,4,7,7 - heptamethyldiethylenetriamine tris(5-ethyl-5-pentylbarbiturate)).

References Cited by the Examiner

UNITED STATES PATENTS

| | | | |
|---|---|---|---|
| 2,654,785 | 10/53 | Miescher et al. | 260—567.6 |
| 2,743,294 | 4/56 | Fakstorp | 260—567.6 XR |
| 2,941,004 | 6/60 | Pinson et al. | 260—567.6 |
| 2,944,902 | 7/60 | Carroll et al. | 260—567.6 XR |

FOREIGN PATENTS

| | | |
|---|---|---|
| 517,147 | 2/53 | Belgium. |
| 567,527 | 12/58 | Canada. |
| 847,900 | 8/52 | Germany. |

OTHER REFERENCES

Edwards et al.: J. Pharm. Pharmacol, volume 12, pages 137T–152T (1960).

Levis et al.: Arch. Int. Pharmacodyn., volume 93, pages 46–54 (1953).

CHARLES B. PARKER, *Primary Examiner.*

NICHOLAS S. RIZZO, *Examiner.*